United States Patent
Keselman et al.

(10) Patent No.: US 11,112,776 B2
(45) Date of Patent: Sep. 7, 2021

(54) AUTOMATIC SYNCHRONIZATION OF PRESS MACHINES AND ROBOTS

(71) Applicant: Fanuc America Corporation, Rochester Hills, MI (US)

(72) Inventors: Leo Keselman, Oak Park, MI (US); Matthew DeNio, Clarkston, MI (US); Eric Lee, Bloomfield Hills, MI (US); Ho Cheung Wong, Troy, MI (US); Peter Swanson, Bloomfield Hills, MI (US); Sai-Kai Cheng, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 25 days.

(21) Appl. No.: 16/336,046

(22) PCT Filed: Sep. 26, 2017

(86) PCT No.: PCT/US2017/053399
§ 371 (c)(1),
(2) Date: Mar. 22, 2019

(87) PCT Pub. No.: WO2018/058092
PCT Pub. Date: Mar. 29, 2018

(65) Prior Publication Data
US 2019/0227532 A1      Jul. 25, 2019

Related U.S. Application Data

(60) Provisional application No. 62/399,744, filed on Sep. 26, 2016.

(51) Int. Cl.
*G05B 19/418* (2006.01)
*B25J 9/16* (2006.01)
(Continued)

(52) U.S. Cl.
CPC ..... *G05B 19/41815* (2013.01); *B21D 43/105* (2013.01); *B25J 9/0084* (2013.01);
(Continued)

(58) Field of Classification Search
CPC .... G05B 19/41815; G05B 2219/31001; G05B 2219/40306; B21D 43/105; B25J 9/0084;
(Continued)

(56) References Cited

U.S. PATENT DOCUMENTS 5,150,451 A * 9/1992 Deplano ............... G05B 19/07
700/248
5,247,608 A * 9/1993 Flemming ............. B25J 9/1676
700/255
(Continued)

FOREIGN PATENT DOCUMENTS

CN      1717316 A    1/2006
CN    101024309 A    8/2007
(Continued)

OTHER PUBLICATIONS

ISA/US, International Search Report dated Dec. 7, 2017 for PCT/US2017/053399.

*Primary Examiner* — Thomas C Lee
*Assistant Examiner* — Michael Tang
(74) *Attorney, Agent, or Firm* — Shumaker, Loop & Kendrick, LLP; John A. Miller

(57) ABSTRACT

Methods and systems include ways to synchronize a press machine and tending robots, including a pick robot and a drop robot, where the press machine includes an operating area for pressing a blank into a part. The pick robot and the part are moved out of the operating area while the drop robot carrying the blank is moved into the operating area. At least a portion of the pick robot and/or the part resides within the operating area at the same time at least a portion of the drop (Continued)

robot and/or the blank resides within the operating area. The pick robot is in communication with the drop robot and the movement of the pick robot is synchronized with the movement of the drop robot to prevent the pick robot or part from colliding with the drop robot or the blank.

19 Claims, 9 Drawing Sheets

(51) Int. Cl.
*B21D 43/10* (2006.01)
*B25J 9/00* (2006.01)
*B25J 11/00* (2006.01)
*B30B 15/14* (2006.01)
*B30B 15/16* (2006.01)

(52) U.S. Cl.
CPC ........... *B25J 9/1682* (2013.01); *B25J 11/005* (2013.01); *B30B 15/14* (2013.01); *B30B 15/16* (2013.01); *G05B 2219/31001* (2013.01); *G05B 2219/40306* (2013.01); *Y02P 90/02* (2015.11)

(58) Field of Classification Search
CPC ........ B25J 11/005; B25J 9/1682; Y02P 90/02; B30B 15/14; B30B 15/16
See application file for complete search history.

(56) References Cited

U.S. PATENT DOCUMENTS

| | | | |
|---|---|---|---|
| 6,439,371 B1* | 8/2002 | Baulier | ................ B21D 39/021 198/468.2 |
| 7,729,804 B2 | 6/2010 | Matsumoto et al. | |
| 7,805,973 B2 | 10/2010 | Bosga et al. | |
| 8,302,452 B2 | 11/2012 | Golorans et al. | |
| 8,315,736 B2 | 11/2012 | Kalbavi et al. | |
| 8,706,295 B2 | 4/2014 | Park | |
| 8,855,817 B2 | 10/2014 | Casanelles et al. | |
| 2006/0217841 A1 | 9/2006 | Matsumoto et al. | |
| 2009/0217724 A1* | 9/2009 | Bosga | .................... B30B 1/266 72/29.2 |
| 2010/0234974 A1* | 9/2010 | Bosga | .................. B30B 15/148 700/100 |
| 2015/0031444 A1 | 11/2015 | Tsuchida et al. | |
| 2019/0065642 A1* | 2/2019 | Simic | ..................... G06F 30/20 |

FOREIGN PATENT DOCUMENTS

| | | | | |
|---|---|---|---|---|
| CN | 103213127 A | | 7/2013 | |
| CN | 105629909 A | | 6/2016 | |
| EP | 1705541 A2 | | 9/2006 | |
| JP | H08202419 A | | 8/1996 | |
| JP | H11104900 A | | 4/1999 | |
| JP | 2009525877 A | | 7/2009 | |
| WO | 20070091964 A2 | | 8/2007 | |
| WO | WO-2014177997 A1 | * | 11/2014 | .............. B27M 1/08 |
| WO | 2018058092 A1 | | 3/2018 | |

\* cited by examiner

AUTOMATIC SYNCHRONIZATION OF PRESS MACHINES AND ROBOTS

CROSS-REFERENCE TO RELATED APPLICATIONS

This application claims the benefit of U.S. Provisional Application No. 62/399,744, filed on Sep. 26, 2016. The entire disclosure of this provisional application is incorporated herein by reference.

FIELD

The present technology relates to synchronizing the motion of press machines and press tending robots to achieve optimal performance.

INTRODUCTION

This section provides background information related to the present disclosure which is not necessarily prior art.

To avoid collisions between a press machine and a press tending robot, after a press machine presses or stamps a part, the press machine can move to a top position, also called Top Dead Center (TDC). A pick robot can then enter the press machine operating area to extract the pressed or stamped part. After the pick robot exits the press machine operating area, a drop robot can enter the press machine operating area to drop a blank to be pressed or stamped into the part. After the drop robot exits the press machine operating area, the drop robot can signal the press machine to come down and start the next cycle of pressing or stamping the blank to form another part.

Although such methods can be safe and prevent press machine and press tending robot collisions, these methods can be inefficient, resulting in a less than optimal throughput. Various ways to improve efficiency include the following: (1) pick robot entering press machine operating area: use Programmable Logic Controller (PLC) to communicate to pick robot on whether press is clear for robot to enter; (2) drop robot entering press machine operating area as pick robot is exiting the press with the pressed or stamped part: use PLC to manage I/O handshake between pick robot and drop robot based on clear signal; and (3) drop robot exiting the press machine operating area as the press is coming down: use drop robot to send signal to PLC to start the next press cycle after the blank is dropped.

These attempts to improve efficiency, however, still present several shortcomings. In (1) above, the PLC has no control of the pick robot approach speed. If the pick robot arrives at a high enough speed before the press is clear for the pick robot to enter the press machine operating area, the pick robot would have to decelerate and wait. However, such a high speed move is not optimal for enhancing robot operating life. Further, there is an inherent PLC delay in PLC communication to the robot controller; therefore, the timing of the pick robot entering the press machine operating area is not optimal. Manual tuning of robot entry timing is often required. In (2) above, the PLC does not have the precise motion trajectory and timing of both the pick and drop robots while inside the press machine operating area. The management of their I/O handshake signal is not optimal. Manual tuning of the drop robot entry timing in relation to the pick robot exit timing is often required. In (3) above, the PLC does not have precise motion timing of the drop robot inside the press machine operating area. Manual tuning of the press start signal by the drop robot is often required; however, such timing is often not optimal. In all three cases, manually tuning can be tedious and not robust. For example, if the programmed positions are changed, or the program overrides of the robots are changed, the previously tuned signal timing cannot be re-used.

Accordingly, there is a continuing need to optimize synchronized motion of one or more press machines in conjunction with one or more press tending robots to improve performance thereof.

SUMMARY

The present inventive technology includes systems and processes that relate to achieving automatic motion synchronization between press machines and press tending robots for optimal performance, ease of use, and consistency in performance. Learning of a press robot motion timing occurs in a learning cycle, and continuous learning of the press machine motion timing can occur in every cycle of one or more press machines and one or more press tending robots as one or more blanks are processed into pressed or stamped parts. Once learnt data is collected, robot approach speed is adjusted and timing is controlled such that the robot enters the press just as the press is open enough to accommodate the robot. The learnt robot motion planning data can also be used to synchronize a press tending robot with another downstream robot tending the same press such that the press robots spend a minimal amount of time inside the press machine as the robots load a blank, unload a pressed or stamped part, and repeat the process by loading a new blank. Learnt data of the press and the robot can also be used by the press robot to signal the press to start the next cycle such that the press robot just exits the press as the press machine is coming down.

In certain embodiments, systems and methods are provided that use an encoder at the press machine to provide press angle or position information to both the drop robot and the pick robot controllers tending the press. The press encoder communication to the robot controllers can use a direct connection or a wireless communication network.

In some embodiments, systems and methods are provided that use a communication network to communicate robot motion planning information as well as real time robot execution timing information and execution states between the at least two robots tending the same press.

In various embodiments, systems and methods are provided that are configured to continuously learn the press angle or position movement and the press timing in every press cycle, and to learn robot motion planning information of both the drop robot and the pick robot when each robot is inside the press machine operating area one at a time during the learn mode. The robot motion planning information can include a motion segment move time and a deceleration time.

In further embodiments, systems and methods are provided that use learnt timing information of the press, and learnt motion timing of the press robots to: (1) adjust robot approach speed such that the robot arrives just in time when the press is open high enough; (2) control the timing when the drop robot can enter the press while the pick robot is moving out of the press; and/or (3) control the timing when the drop robot can signal the press to start the next cycle as the drop robot is moving out of the press. Press interlock angles can be determined automatically, based on an input press profile and the height of the robot path determined during learn mode. Not only does this make setup easier, it means the system can maintain performance and machine protection over time as operators adjust the path by automatically re-learning the interlock angles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
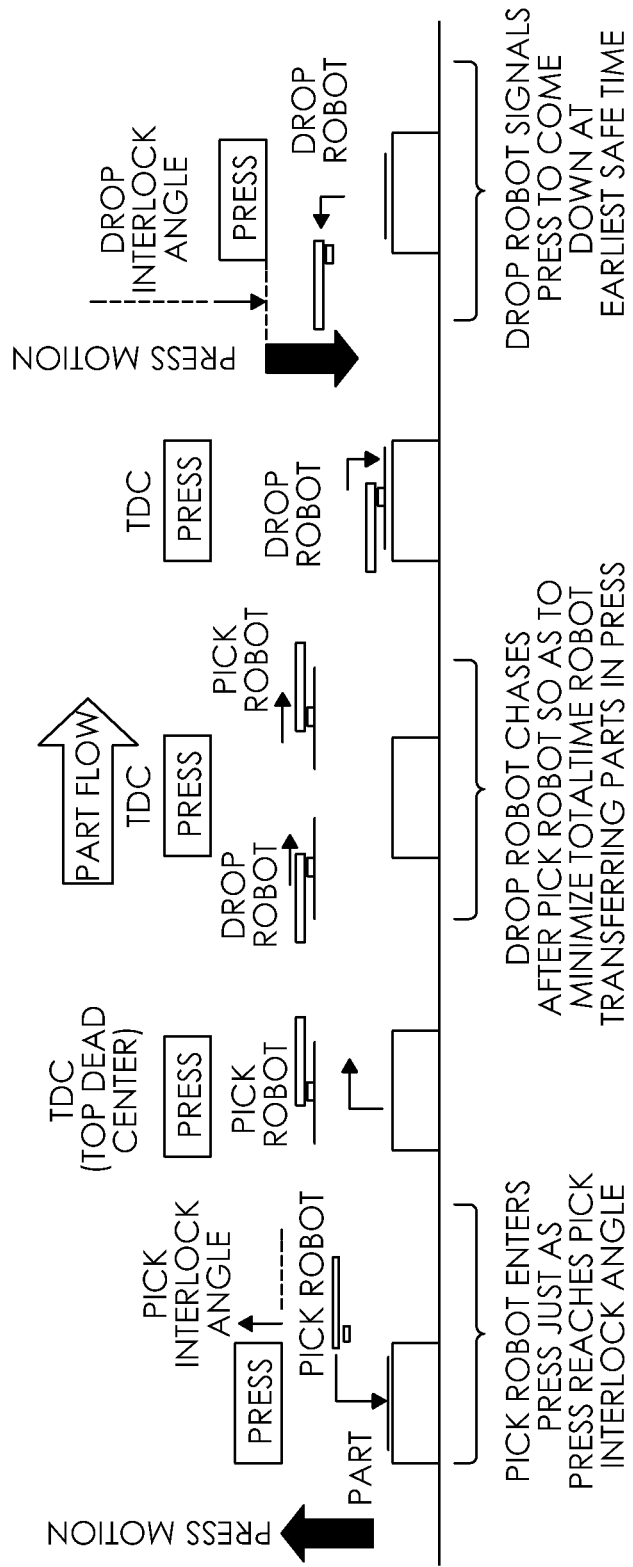
FIG. 1 is an illustration of three areas of synchronization to be achieved by this present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

The present technology provides various ways to achieve motion synchronization between one or more press machines and one or more tending robots in relation thereto in a given press line, where there can be multiple press machines and multiple tending robots, with the robots being in between the press machines as well as in the front and at the end of the press line. Included are methods and systems for synchronizing a press machine, a pick robot, and a drop robot, where the press machine includes an operating area for pressing a blank into a part. The operating area of the press machine is opened after a pressing of the part. The pick robot is moved into the operating area of the press machine as the opening of the operating area of the press machine reaches a pick interlock angle prior to a top dead center position. The part is picked from the operating area of the press machine using the pick robot. The pick robot and the part are moved out of the operating area while the drop robot carrying the blank are moved into the operating area. At least a portion of the pick robot or at least a portion of the part resides within the operating area at the same time at least a portion of the drop robot or at least a portion of the blank resides within the operating area. The pick robot is in communication with the drop robot, where the movement of the pick robot is synchronized with the movement of the drop robot to prevent the pick robot or part from colliding with the drop robot or the blank. The blank is dropped into the operating area of the press machine using the drop robot. And the drop robot is moved out of the operating area of the press machine.

The drop robot can further communicate to the press machine that the drop robot will not collide with the press machine during a closing of the operating area of the press machine. Accordingly, the operating area of the press machine can be closed to press the blank into another part. Moving the drop robot out of the operating area of the press machine can also include moving the drop robot out of the operating area of the press machine as the closing of the operating area of the press machine reaches a drop interlock angle prior to a bottom dead center position.

As used herein, a press machine is also referred to simply as a press. Likewise, a given tending robot can be a pick robot or a drop robot depending on the current operation of the robot in relation to a given press. For example, a single press and two tending robots (e.g., a drop robot and a pick robot) can be represented as follows:

$$R_1 \rightarrow P_1 \rightarrow R_2$$

Where the first robot ($R_1$) is considered a drop robot with respect to the press ($P_1$) and the second robot ($R_2$) is considered a pick robot with respect to the press ($P_1$). Likewise, a section of a generalized series of robots ($R_N$) and presses ($P_N$) can be described as:

$$R_N \rightarrow P_N \rightarrow R_{N+1}$$

where ($R_N$) is considered a drop robot with respect to ($P_N$) and ($R_{N+1}$) is considered a pick robot with respect to ($P_N$). Multiple segments of presses and tending robots can be arranged in a series, for example, where a first press ($P_1$), a second press ($P_2$), third press ($P_3$), and so on, up to an N press and associated tending robots can be represented as:

$$R_1 \rightarrow P_1 \rightarrow R_2 \rightarrow P_2 \rightarrow R_3 \rightarrow P_3 \rightarrow R_4 \rightarrow (\ldots) \rightarrow P_N \rightarrow R_{N+1}$$

It therefore follows that a part can be considered a blank or a stamped or pressed part based on a relationship of the part to a given press. For example, a part delivered to a given press can be referred to as a blank for that particular press, but the blank may have already been subjected to a prior stamping or pressing operation by a previous press. Likewise, a stamped or pressed part can be referred to as a blank when delivered to a subsequent press. It is therefore understood that the present technology is applicable to the relationship between any given robot tending any given press, as well as a series of robots respectively tending a series of presses. The present technology is accordingly understood to apply to scenarios where a series of presses operate on one or more parts that are picked/dropped by tending robots, where the series of presses and tending robots can be configured as a single processing stream or where multiple processing streams can either converge or diverge, allowing multiple parts to feed together and/or where parts are split into different pressing operations. Reference herein to a robot and an associated controller also apply to multiple robots, multiple controllers, and/or master/slave robot configurations.

Movement, control, and synchronization of robots can include multiple movement segments. For example, moving the pick robot and the part out of the operating area can include a plurality of pick segment movements and moving the drop robot carrying the blank into the operating area can include a plurality of drop segment movements. A parameter associated with one of the pick segment movements can then be used by the drop robot to synchronize movement of the pick robot and the drop robot. Likewise, a parameter associated with one of the drop segment movements can be used by the pick robot to synchronize movement of the pick robot and the drop robot. The parameter associated with one of the pick segment movements or the parameter associated with one of the drop segment movements can include a movement length, a movement time, an acceleration time, a deceleration time, and/or a current location. Other parameters associated with robot segment movements can also be used. A plurality of parameters associated with the plurality of pick segment movements and/or the plurality of drop segment movements can be used by the respective pick robot and/or drop robot to synchronize movement of the pick robot and the drop robot.

Use of such parameters can facilitate synchronization and safety of the robots. In certain embodiments, for example, the plurality of parameters associated with the plurality of pick segment movements can be measured. By comparing the measured parameters with preexisting pick segment parameters, it is possible to determine if the pick robot is within a pick synchronization threshold. If not, the pick robot can be moved to a safe space outside of the operating area of the press machine. In a similar fashion, the plurality of parameters associated with the plurality of drop segment movements can be measured and compared with preexisting drop segment parameters to determine if the drop robot is within a drop synchronization threshold.

The pick synchronization threshold and the drop synchronization threshold can be used in various ways. The drop robot can be moved to a safe space outside of the operating area of the press machine when the drop robot is outside of the drop synchronization threshold. Such preexisting pick segment parameters can include recorded pick segment parameters from programing of the pick robot and the preexisting drop segment parameters can include recorded drop segment parameters from programing of the drop robot. The preexisting pick segment parameters can also include recorded pick segment parameters from prior operation of the pick robot, where the preexisting drop segment parameters can also include recorded drop segment parameters from prior operation of the drop robot. In this manner, the pick robot can be adjusted to operate within the preexisting pick segment parameters when the pick robot is outside of the pick synchronization threshold and/or the drop robot can be adjusted to operate within the preexisting pick segment parameters when the drop robot is outside of the pick synchronization threshold.

Pick segment movements and drop segment movements can be understood as subdivisions of the overall respective robot movement, including the synchronized movement of the pick and drop robots. Segments can be defined by certain parameters, including movement length, movement time, acceleration time, deceleration time, current location, change in direction, orientation, and/or rotation. The segments can relate to the overall robot movement and can also relate to parameters for particular links, joints, and axes of multi-axis robots.

Methods and systems of the present technology can further include communicating to the press machine using the drop robot that the drop robot will not collide with the press machine during a closing of the operating area of the press machine. In this way, the operating area of the press machine can be closed to press the blank into another part. Moving the drop robot out of the operating area of the press machine can further include moving the drop robot out of the operating area of the press machine as the closing of the operating area of the press machine reaches a drop interlock angle prior to a bottom dead center position. The drop robot carrying the blank moving into the operating area can include a plurality of drop segment movements, where a parameter associated with one of the drop segment movements can be used by the press machine to synchronize movement of the press machine with the movement of the drop robot. This can prevent the drop robot or blank from colliding with the press machine during the closing of the operating of the press machine to press the blank into another part.

It is understood that the pick robot can be further configured as a downstream drop robot for a downstream press machine to deliver the part as a downstream blank to the downstream press machine for a pressing of the downstream blank into a downstream part. Accordingly, the downstream drop robot (i.e., formerly operating as the pick robot) can be in communication with a downstream pick robot. Movement of the downstream pick robot can be synchronized with the movement of the downstream drop robot to prevent the downstream pick robot or the downstream part from colliding with the downstream drop robot or the downstream blank. This scenario can continue with successive presses and tending robots, including convergent and divergent work flows.

In certain embodiments, the pick robot can be synchronized with the movement of the drop robot in a way that includes a critical point, where the critical point defines a condition where the pick robot or part will collide with the drop robot or the blank. Moving the pick robot and the part out of the operating area while moving the drop robot carrying the blank into the operating area can therefore be dependent on the pick robot and the drop robot communicating with respect to the critical point, where one of the pick robot and the drop robot waits until the other of the pick robot and the drop robot clears the critical point. As noted herein, moving the pick robot and the part out of the operating area can include a plurality of pick segment movements, where a plurality of parameters is associated with the plurality of pick segment movements, where likewise, the moving of the drop robot carrying the blank into the operating area can include a plurality of drop segment movements and a plurality of parameters associated with the plurality of drop segment movements. Accordingly, a parameter associated with the plurality pick segment movements and/or a parameter associated with the plurality drop segment movements can be adjusted to minimize the wait of the one of the pick robot and the drop robot. The parameter associated with the plurality pick segment movements and/or the parameter associated with the plurality drop segment movements can include a movement length, a movement time, an acceleration, and/or a deceleration, for example.

The present technology also includes ways to synchronize press machines and robots by learning press motion timing and robot motion planning data. Press timing can be learnt when the press cycles, starting when the press is at Top Dead Center (TDC). A table with press angle or position and the time from when the press was at Top Dead Center can be recorded. The press timing table can be continuously updated in each press cycle and checked as to whether the press timing remains close to the last recorded data. If the press timing has not changed beyond a threshold, the press timing table can be used to compute press times until one or more critical points occur during robot synchronization with the press. If the press timing has changed beyond the threshold, the robot can enter a safe mode for re-learning. Robot planning data including segment move time and deceleration time for each motion segment of both a pick path and a drop path of the robot can be learnt in this fashion. Press interlock angles can be determined automatically, based on an input press profile and the height of the robot path determined during learn mode. Not only does this make setup easier, it means the system can maintain performance and machine protection over time as operators adjust the path by automatically re-learning the interlock angles.

Synchronization of a robot to a press on the pick side can also include predicting the press time to a Pick Interlock Angle using a press timing table by subtracting a time at Pick Interlock Angle by a time at a current press angle, prior to initiating a robot motion to pick pounce. The planned motion speed of the robot move to pick pounce can be adjusted, such that the robot motion to its pick press entrance point is the same as the press time until Press Interlock Angle. As the robot approaches the pick pounce, the time until the pick pounce and the press time can be monitored until the press reaches the Pick Interlock Angle, where the robot can be held from entering the press if the robot is predicted to approach the press earlier.

Synchronize of a robot from the drop side of the press to chase after a robot from the pick side of the press can also include exchanging motion planning data between a pick robot and a drop robot over a communication network, where the planning data can be used by one or both of the robots to determine a chase critical point. A potential critical point on the robot paths can be determined such that the pick robot path is no longer in the way of the drop robot path. Another potential critical point on the pick robot path can be determined where all the points after it are faster along the direction of flow than the more downstream points on the drop robot path. The true critical point can be determined as the most upstream of the two potential critical points. One or both robots having the planning data can determine a segment number and a segment interpolation number for the chase critical point of the drop and pick robots and communicate it to the other robot. During a synchronized mode of robot chasing, the drop robot approach speed can be adjusted such that its time until the chase critical point is just after the pick robot time to the chase critical point. When the drop robot approaches the drop pounce, the drop robot time to the chase critical point can be check to see if it is just after the pick robot time to the chase critical point, otherwise the drop robot can be held until the pick robot time to the chase critical point becomes less than the drop robot time to the chase critical point.

Other ways to synchronize a robot to a press on the drop side include determining the press time until press Drop Interlock Angle from Top Dead Center using the press timing table. Counting down the drop robot time until the drop exit critical point after the drop robot enters the press can then occur. When the drop robot time until the drop exit critical point is less than the press time until the Drop Interlock Angle, the robot can then signal the press to come down to start the next press cycle.

EXAMPLES

Example embodiments of the present technology are provided with reference to the several figures enclosed herewith.

Three areas of motion synchronization between the press machine and press tending robots are illustrated in FIG. 1, which include:

1) Pick robot to press synchronization: The pick robot enters the press just as the press machine is going up and reaches a pick interlock angle, which is an angle or position of the press high enough for the pick robot carrying its tooling to enter the press without any collision.

2) Robot to robot synchronization: The drop robot chases after the pick robot so as to minimize the total time the pick robot and the drop robot are inside the press, each respectively carrying a part or blank, and without collision between the pick robot and the drop robot. The pick robot just picks up a stamped or pressed part and is leaving the press, while the drop robot is carrying a blank to load into the press for stamping in the next press cycle.

3) Drop robot to press synchronization: The drop robot signals the press to come down for the next press cycle at the earliest safe time, such that the press is at a drop interlock angle or position when the drop robot just exits the press without any collision.

Figure 1A:
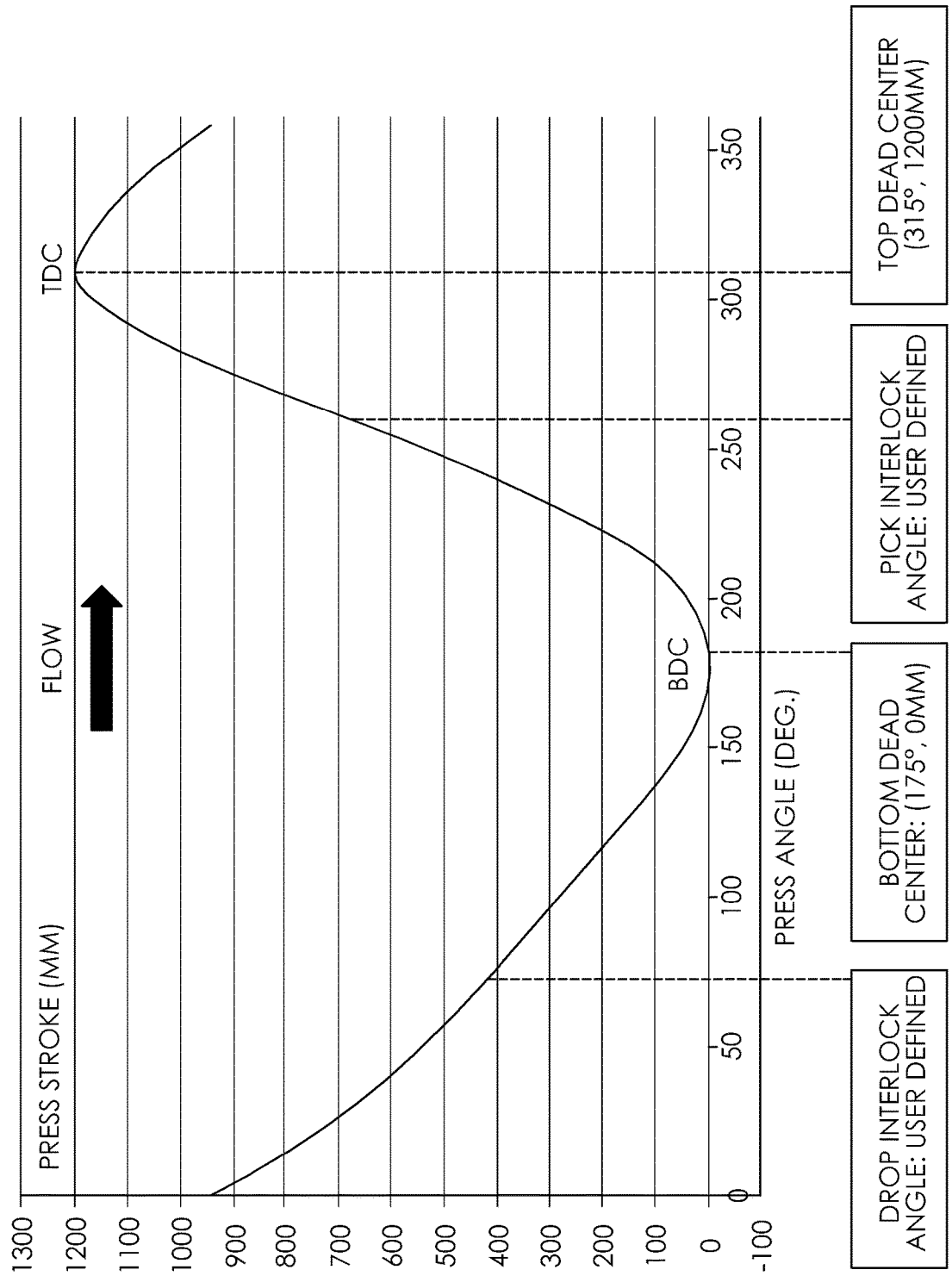
FIG. 1A is an illustration of an example of press machine angle and position during a press cycle.

FIG. 1A is an illustration of the example of press machine angle and position during the press cycle.

The series of motions illustrated in FIG. 1 can apply to a single press machine tended by a pick robot and a drop robot. Alternatively, there can be multiple press machines tended by multiple robots. For example, a first robot (e.g., a drop robot) can drop a blank into a first press, the first press can then press or stamp the blank into a part, and a second robot (e.g., a pick robot) can then remove the part from the first press. The second robot can then drop the part into a second press, the second press can then further press or stamp the part, and a third robot (e.g., a pick robot) can then remove the further pressed or stamped part from the second press. The process can then continue with additional presses and additional robots. It can therefore be seen that a robot can operate as a pick robot in the context of a certain press and the same robot can operate as a drop robot in the context of a successive press.

Figure 2:
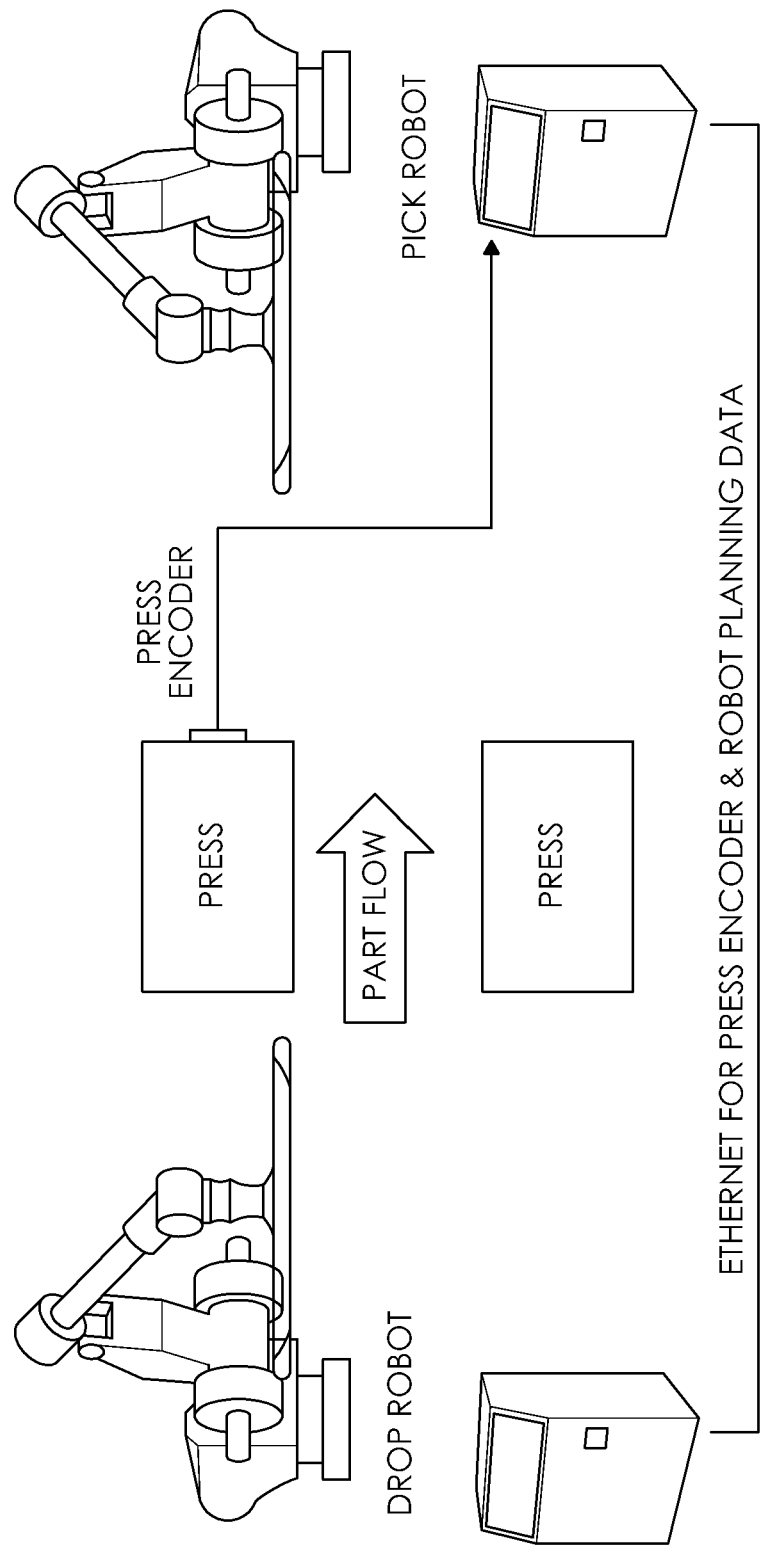
FIG. 2 is an illustration of a communication infrastructure.

As illustrated in FIG. 2, each robot can be provided with encoder information from both an upstream press and a downstream press and also motion timing and execution state information from one or more robots, including an upstream and/or a downstream robot. The encoder can be directly connected to the robot controller, through an Ethernet encoder connection, or an Ethernet I/O connection to another robot that has access to the encoder signal. The upstream robot and the downstream robot can therefore communicate motion planning, timing, and state information over a communication network, such as an Ethernet.

Figure 3:
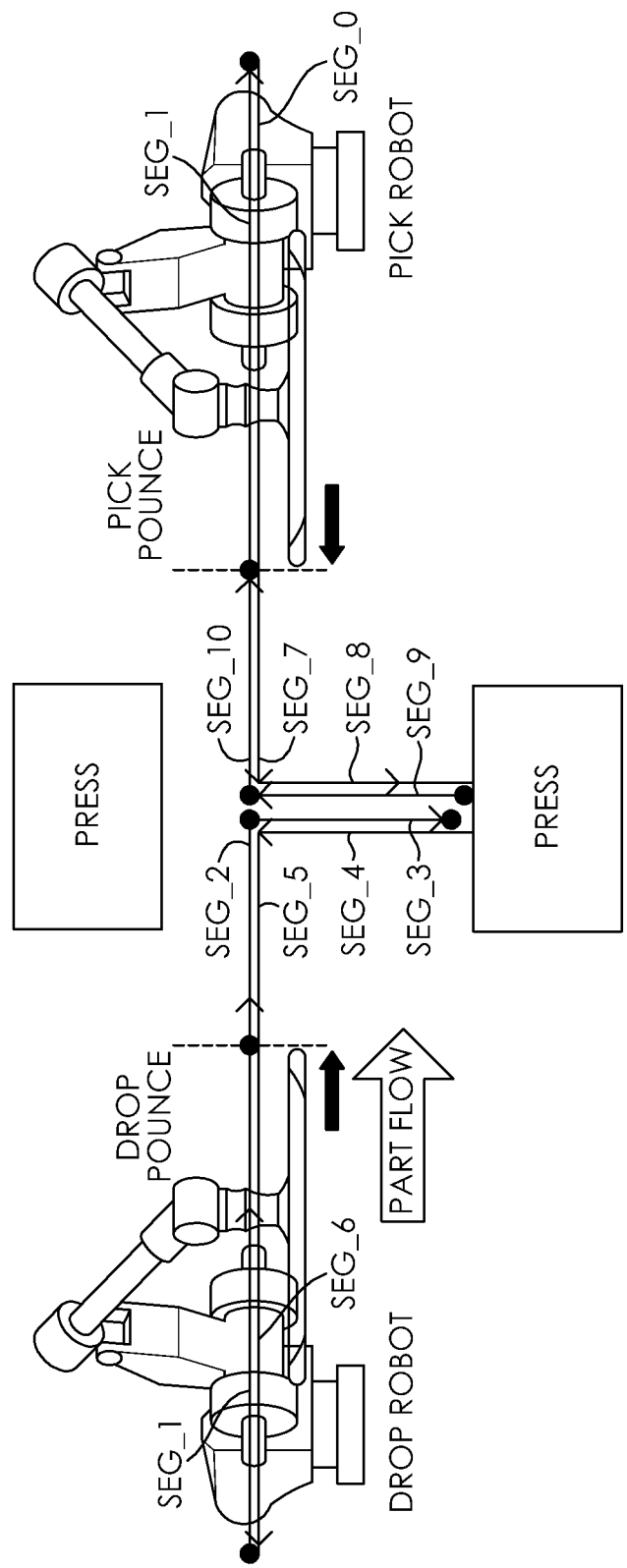
FIG. 3 is a robot path overview of the pick and drop robots interacting around and inside a press machine.
Figure 3A:
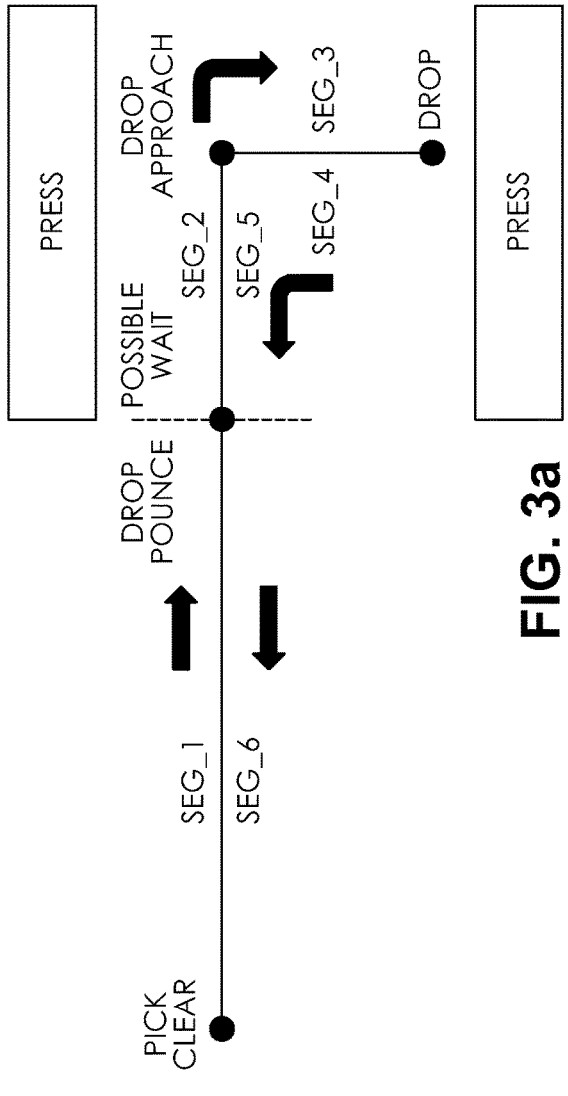
FIG. 3a is drop robot taught point layout as it approaches and leaves the press.
Figure 3B:
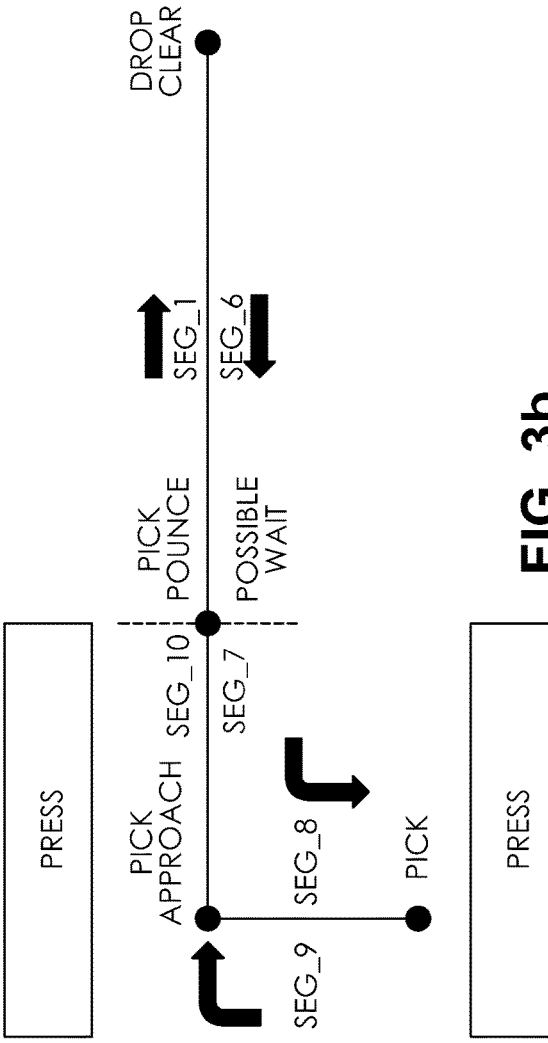
FIG. 3b is pick robot taught point layout as it approaches and leaves the press.

FIG. 3 illustrates an overview of the paths of the pick robot and the drop robot as each enters and exits the press machine. A plurality of motion segments is shown for each robot. FIG. 3a illustrates the details of a drop robot path as the drop robot clears an upstream press with a part, transfers the part to a downstream press towards a drop pounce position, enters the press around a drop approach position, before finally moving down to a drop position where the robot drops the part for the press to stamp. After the part is dropped, the drop robot returns through a similar path to exit the press, and heads back towards an upstream press to pick up another stamped part. FIG. 3b illustrates the details of a pick robot path as the pick robot clears a downstream press after dropping a part, heads back to an upstream press towards a pick pounce position, enters the press, rounding towards a pick approach position, before moving down to a pick position to pick up a stamped part, before the pick robot begins to exit the press through a similar path, and heads downstream to transfer the part to a downstream press. From the illustrations of FIGS. 3, 3a, and 3b, a press-to-press transfer robot moving upstream would function as a pick robot to pick up a part, and then function as a drop robot as it moves downstream to transfer the part to a downstream press.

Figures 4, 5:
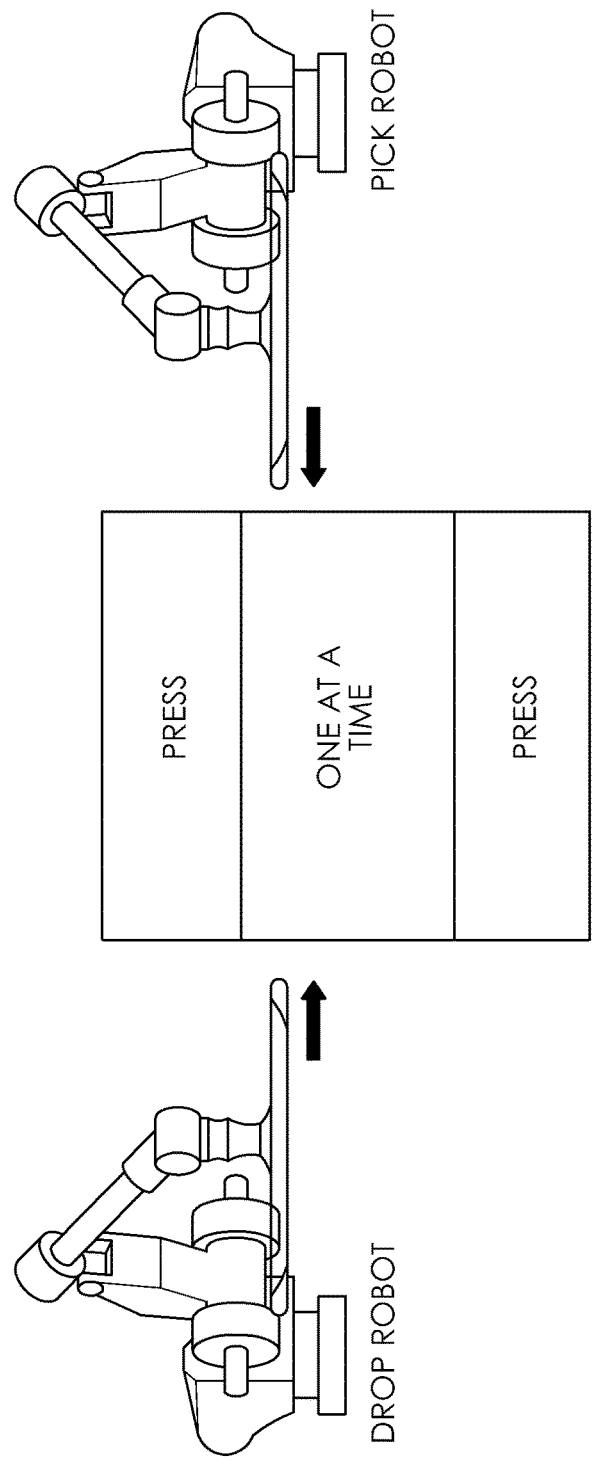
FIG. 4 is an illustration of the learn mode operation of the system, where one robot is in the press at one time.
FIG. 5 is an illustration of the learning data of the press machine to be collected.

As illustrated in FIG. 4, the present technology includes a method to learn and adjust the timing of the press movement, and to learn and adjust the robot motion planning information which includes the robot segment move time and acceleration time in a learn mode. The learnt information will then be used later during synchronized mode to adjust and synchronize the press and robot movements. The purpose of the learn or adjust mode is twofold:

1) It limits the interactions between the robots and the press such that only one is active within the common area at any one time. Performance is not optimal but the operation is very safe, with no chance of collision possible.

2) To gather the robot motion planning information necessary to run the system in synchronized mode. In the synchronized mode, the press, the pick robot and the drop robot can be active in the common areas simultaneously but the interaction is still safe while providing optimal performance.

In particular, the present technology further relates to a method of learn mode with the following steps: (1) the pick robot commanded position does not enter the press until the press passes its pick interlock angle; (2) the drop robot waits until the pick robot is clear of the press before entering; and (3) the drop robot does not signal the press to come down until it is clear of the press. The present technology includes a learn mode which corresponds to a particular robot. If a robot is in a learn mode, its pick timing information cannot be used by the upstream drop robot and therefore the upstream drop robot should be in a "drop learn mode." The downstream pick robot is not affected by the learn mode of its upstream robot. Therefore, aside from the fully safe learn mode that a robot is in, there is the method of a "Drop Learn Mode," which relates to a robot on the drop side waiting until the pick robot is clear of the press before entering. If the press timing information turns out to be incorrect, there are two other safe modes: (1) Drop-Press-Safe mode, where drop robot does not signal the press to come down until the robot is clear of the press; and (2) Pick-Press-Safe mode, where the robot commanded position does not enter the pick-side press until the pick-side press is past the pick interlock angle.

The present technology also includes ways to learn the press timing from the time the press was at Top Dead Center (TDC). FIG. 5 shows an example of a press timing table. As soon as the press starts moving from TDC, this method records that time as 0. Every time it traverses a pre-defined press angle (e.g. 0.5 degree) or position movement interval, this method records the total time elapsed since it was at Top Dead Center. For each robot, this method maintains two tables, one for the upstream press and one for the downstream press. Each time the press cycles, this method checks if the current table is still close to the recorded value and updates the table. In the majority of cases, these times should be nearly identical, and the table is used for press timing prediction during synchronized mode. If the new times are very different, the rest of the values in the recorded table cannot be trusted and this method will put the robot into the drop-press-safe mode or the pick-press-safe mode, depending on whether the press is upstream or downstream.

Figure 6:
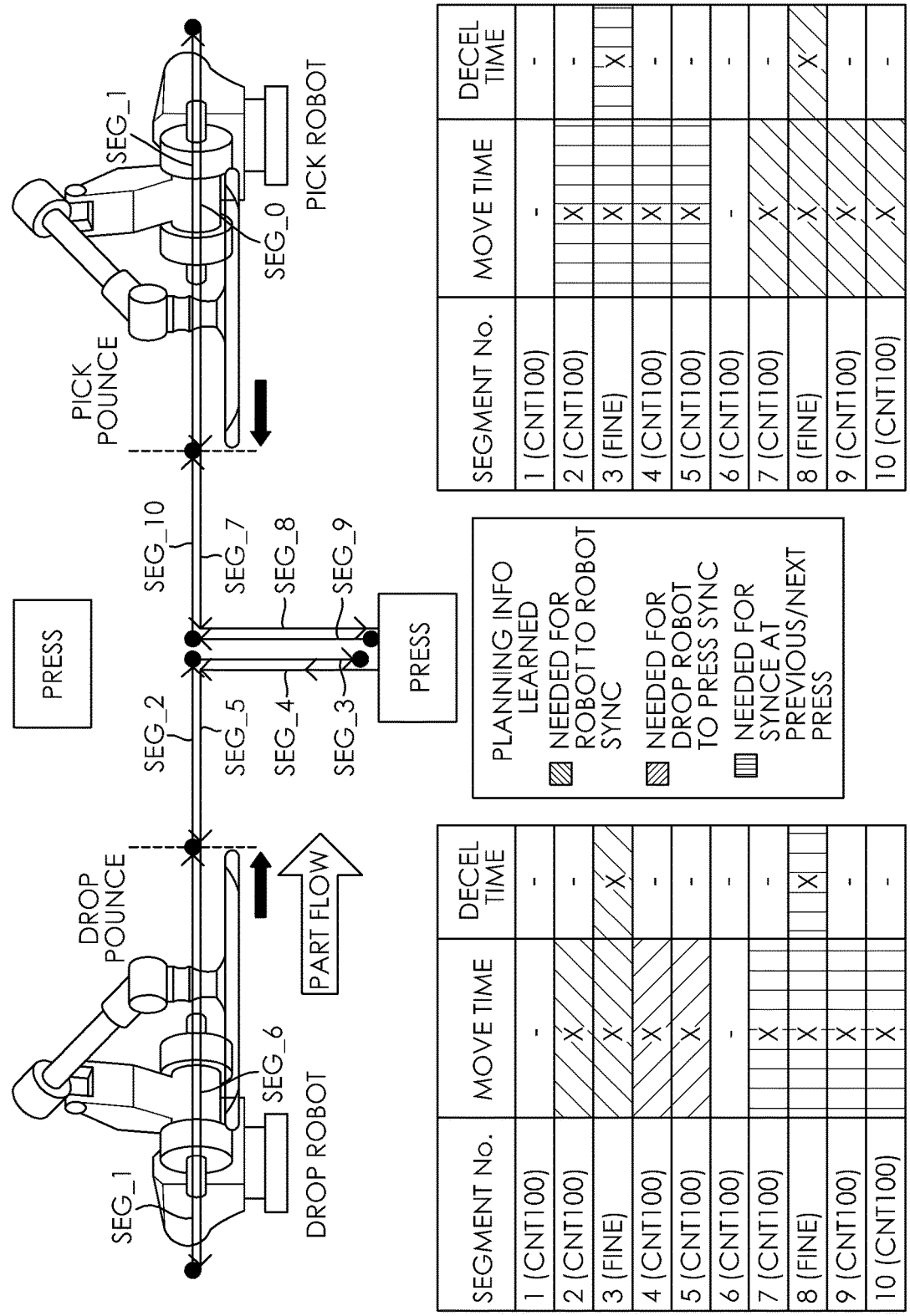
FIG. 6 is an illustration of the learning data of the drop and pick robots to be collected.

The present technology also includes ways to adjust or learn the drop robot motion and the pick robot motion planning data as shown in FIG. 6. The robot learning data includes segment move time and deceleration time. During runtime, this method uses the learnt robot data to determine the time to a number of critical points or positions. These critical points include: (1) drop chase critical point; (2) pick chase critical point; (3) drop exit critical point; and (4) pick enter critical point. At any time during the interpolation of the current segment, the time to any of the critical points is determined by summing the remaining time of the current segment, plus the segment time, and deceleration time if necessary, for each and every one of the future segments, until the segment which has the critical point. If the critical point is somewhere in the middle of a segment, the summation of segment times is only up to the interpolation point of the critical point.

With the press timing and the pick robot path data learnt, the present technology automatically adjusts and synchronizes the timing when the pick robot enters the press, such that pick robot arrives at the press just after the press passes the Pick Interlock Angle allowing the robot to enter the press without slowing down. This not only improves throughput, but also robot life because it minimizes the frequency that the robot needs to speed up to high speed to the pick pounce position, but only to decelerate to rest and wait for the press to open.

Figure 7:
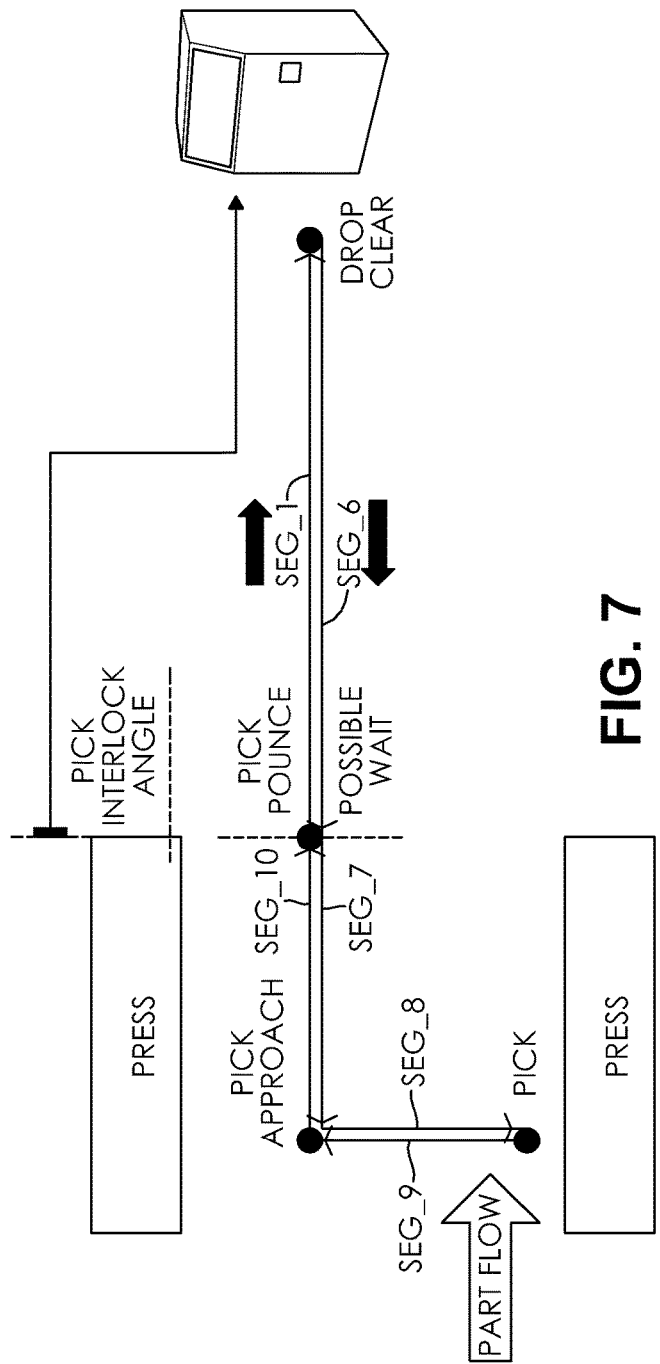
FIG. 7 is an illustration of the synchronized mode of operation for the pick robot to enter the press machine.

The present technology achieves pick side press synchronization (see FIG. 7) by the following steps: (1) right before the segment to pick pounce is about to start, this method determines the press time to Pick Interlock Angle, this is done by subtracting the press time at Pick Interlock Angle from the learnt press table by the press time at the current press angle; and (2) the robot motion segment speed for going to pick pounce is planned such its segment move time to the pick press entrance point is the same as the time to Pick Interlock Angle.

Prior to entering the press, the present technology also checks whether the press will get to the Pick Interlock Angle before the robot gets to pick pounce. The time to Pick Interlock Angle is computed using the press position vs time table. The time to pick pounce is the remaining robot interpolation time. The motion segment entering the pick press will be prevented from starting until the time for the robot until pick enter critical point is greater than the pick press time until the Pick Interlock Angle.

Figure 8:
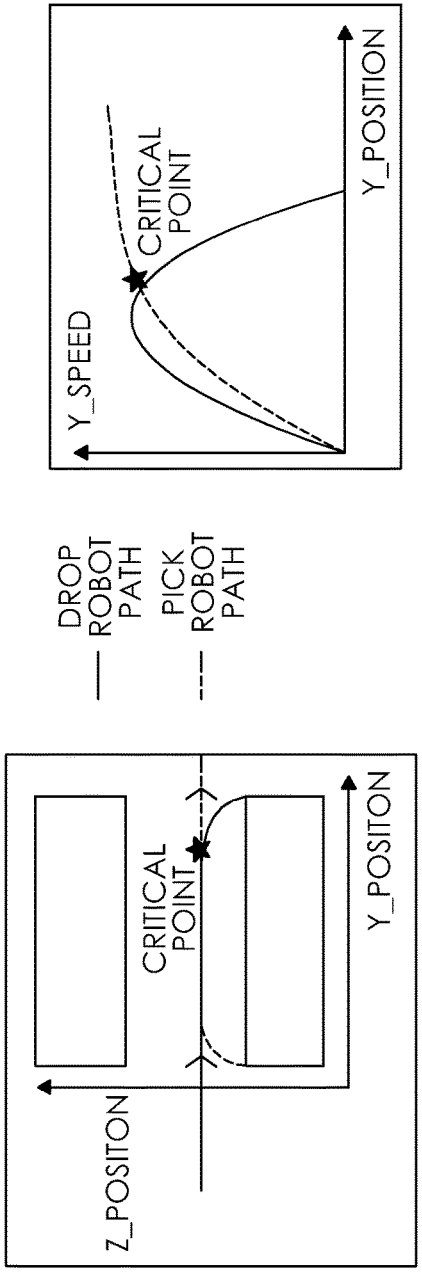
FIG. 8 is an illustration of the learning critical point to be determined for the drop robot to chase after the pick robot without collision.

FIG. 8 shows how the present technology determines the robot chasing critical point or position. To achieve optimal performance, this method times the drop robot motion such that the drop motion happens as quickly as possible and the robots are inside the press as little time as possible. FIG. 8 shows the drop robot path which is traced by the downstream edge of the robot with its tooling and part. The pick robot path is traced by the upstream edge of the pick robot with its tooling and part after it picks the part. There are two possible critical points to consider: Point (1) The star in the diagram represents a possible critical point on the pick robot path, once the pick robot gets to this point, it is no longer in the way of the drop robot path. Point (2) Another possible critical point is the point on the pick robot path where all the points after it are faster along the direction of flow than the more downstream points on the drop robot path. Then, the true critical point is the most upstream of these two possible critical points.

The present technology achieves optimal performance by satisfying the following conditions: (1) The drop robot is as close as possible to the pick robot at the critical point; and (2) The drop robot is moving as quickly as possible at the critical point. During learn mode, the pick robot records its path information including segment number, and the interpolation point number within the segment. The drop robot also records its path information including segment number, and the interpolation point number within the segment. The drop robot then receives path information from the pick robot. Having the path information for both robots, the drop robot then determines the critical point for chasing, including the segment number and interpolation point number within the segment for both the pick robot and the drop robot. The drop robot then transfers pick robot critical point information to the pick robot.

Figure 9:
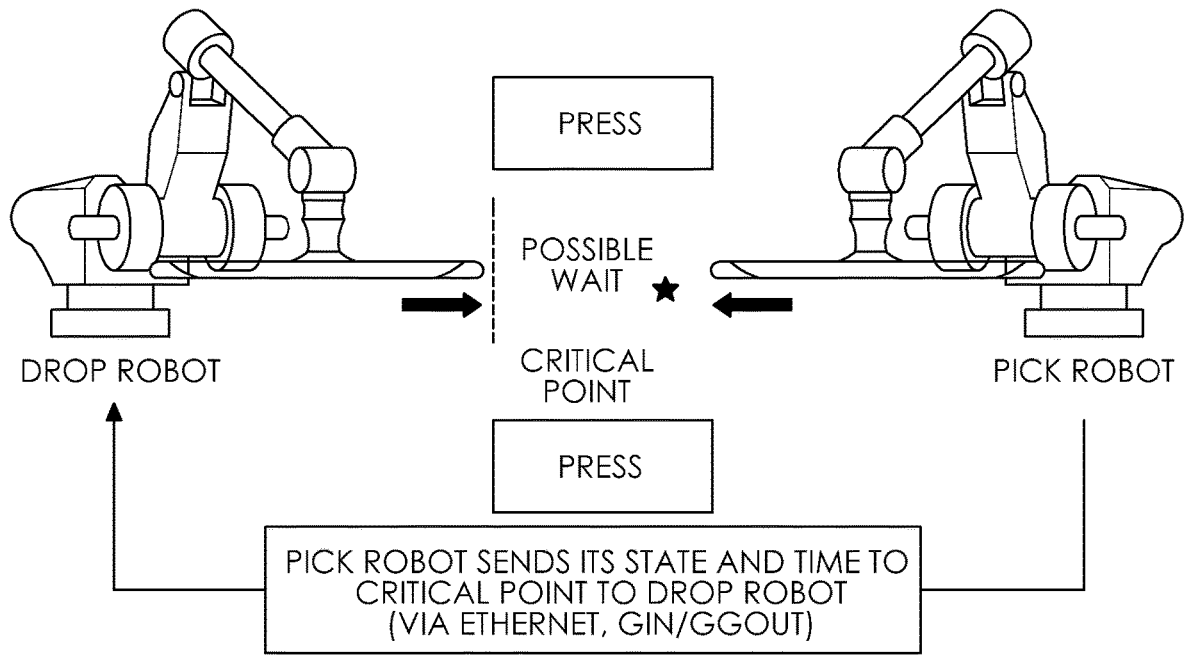
FIG. 9 is an illustration of synchronized mode of operation for the drop robot to chase after the pick robot without collision.

In FIG. 9, during synchronized mode for robot chasing, the pick robot computes its time to critical point using the robot path information recorded during the learn mode, and communicates it to the drop robot. The first time pick robot time to critical point is used will be before the start of the drop robot move to the drop pounce position. The present technology adjusts the drop robot speed on the approach to the drop pounce position based on the following computation:

$$\text{drop\_robot\_motion\_time\_to\_drop\_pounce\_position} = \\ \text{pick\_robot\_time\_to\_critical\_point} - \text{drop\_robot\_time\_to\_critical\_point\_from\_the\_pounce\_position}$$

If the pick robot time to the critical point is not available when the drop robot is about to start the move to the drop pounce, the drop robot proceeds to the drop pounce with its programmed speed. When the drop robot is approaching the drop pounce, it checks whether it can enter the press. If the pick robot time to critical point is less than the drop robot time to critical point, i.e. the pick robot can get to the critical point faster than the drop robot, then the drop robot can proceed to enter the press. Otherwise, the drop robot will be held at the drop pounce position, until the pick robot time to the critical point is less than the drop robot time to the critical point. While the drop robot is chasing the pick robot, their times until the critical point are constantly being checked. If at any time the pick robot time to the critical point begins to cross over to become longer than the drop robot time to the critical point, the drop robot will immediately be held or even stopped to prevent potential collision. An adjustment tolerance is provided for a user to adjust this collision prevention buffer distance.

Figure 10:
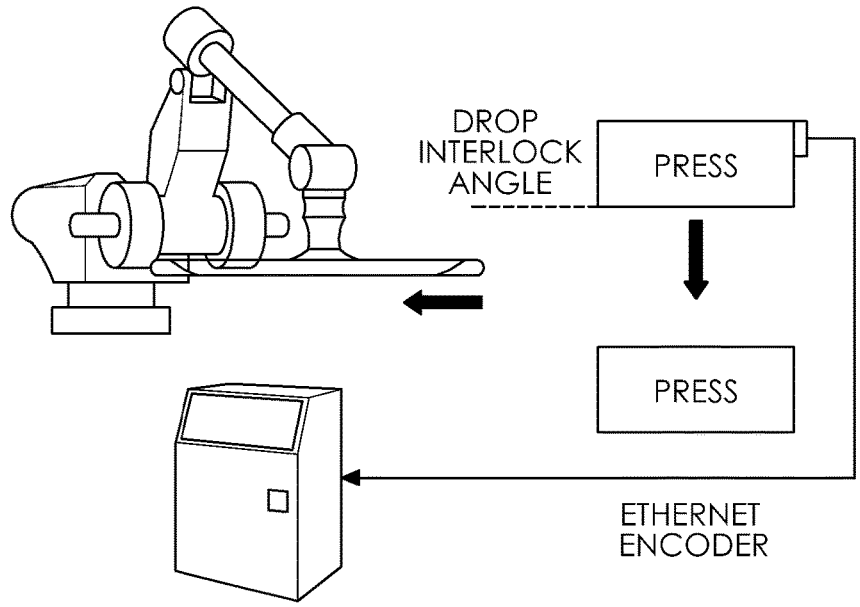
FIG. 10 is an illustration of the synchronized mode of operation for the drop robot to signal the press to start the next cycle such that it exits the press on time.

In FIG. 10, the present technology controls the drop robot synchronization with the press by controlling the time to signal the press to come down at the earliest moment such that there would not be a collision between the drop robot and the press as the drop robot leaves the press. The present technology controls the timing of signaling the press to come down, such that the drop robot becomes clear of the press at the same moment when the press reaches the Drop Interlock Angle.

During the drop side synchronized mode, once the drop robot enters the drop press, the present technology begins to count down the drop robot time until it is clear of the press. This is done by going through the list of learnt segment path data until coming to the one with the press clear point by adding the segment times and the deceleration times along the way. The press should be at TDC during this time and the press time to Drop Interlock Angle can be computed from the press position vs time table. Once the robot time to be clear of the press becomes less than the press time to Drop Interlock Angle, the drop robot sends a signal for the press to come down.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of synchronizing a press machine, a pick robot, and a drop robot, the press machine including an operating area for pressing a blank into a part, the method comprising:
opening the operating area of the press machine after a pressing of a part;
moving the pick robot into the operating area of the press machine as the opening of the operating area of the press machine reaches a pick interlock angle prior to a top dead center position;
picking the part from the operating area of the press machine using the pick robot;
moving the pick robot and the part out of the operating area while moving the drop robot carrying the blank into the operating area, at least a portion of the pick robot or at least a portion of the part residing within the operating area at the same time at least a portion of the drop robot or at least a portion of the blank resides within the operating area, wherein the pick robot is in communication with the drop robot and the movement of the pick robot is synchronized with the movement of the drop robot to prevent the pick robot or part from colliding with the drop robot or the blanks including a critical point defining a condition where the pick robot or the part will collide with the drop robot or the blank, and the critical point is determined by determining a first point based on positions of the pick robot and the drop robot and determining a second point based on velocity of the pick robot relative to the drop robot for a remainder of a current path and selecting the first point or the second point;
dropping the blank into the operating area of the press machine using the drop robot; and
moving the drop robot out of the operating area of the press machine.

2. The method of claim 1, further comprising:
communicating to the press machine using the drop robot that the drop robot will not collide with the press machine during a closing of the operating area of the press machine; and
closing the operating area of the press machine to press the blank into another part.

3. The method of claim 2, wherein moving the drop robot out of the operating area of the press machine comprises moving the drop robot out of the operating area of the press machine as the closing of the operating area of the press machine reaches a drop interlock angle prior to a bottom dead center position.

4. The method of claim 1, wherein:
moving the pick robot and the part out of the operating area includes a plurality of pick segment movements; and
moving the drop robot carrying the blank into the operating area includes a plurality of drop segment movements.

5. The method of claim 4, wherein:
a parameter associated with one of the pick segment movements is used by the drop robot to synchronize movement of the pick robot and the drop robot; or
a parameter associated with one of the drop segment movements is used by the pick robot to synchronize movement of the pick robot and the drop robot.

6. The method of claim 5, wherein the parameter associated with one of the pick segment movements or the parameter associated with one of the drop segment movements includes a member selected from the group consisting of: a movement length, a movement time, an acceleration time, a deceleration time, a current location, and combinations thereof.

7. The method of claim 4, wherein a plurality of parameters associated with the plurality of pick segment movements is used by the drop robot to synchronize movement of the pick robot and the drop robot and a plurality of parameters associated with the plurality of drop segment movements is used by the pick robot to synchronize movement of the pick robot and the drop robot.

8. The method of claim 7, wherein:
the plurality of parameters associated with the plurality of pick segment movements includes a member selected from the group consisting of: a movement length, a movement time, an acceleration time, a deceleration time, a current location, and combinations thereof; and
the plurality of parameters associated with the plurality of drop segment movements includes a member selected from the group consisting of: a movement length, a movement time, an acceleration time, a deceleration time, a current location, and combinations thereof.

9. The method of claim 7, further comprising a member of the group consisting of:
measuring the plurality of parameters associated with the plurality of pick segment movements, comparing the measured parameters with preexisting pick segment parameters to determine if the pick robot is within a pick synchronization threshold, and moving the pick robot to a safe space outside of the operating area of the press machine when the pick robot is outside of the pick synchronization threshold;
measuring the plurality of parameters associated with the plurality of drop segment movements, comparing the measured parameters with preexisting drop segment parameters to determine if the drop robot is within a drop synchronization threshold, and moving the drop robot to a safe space outside of the operating area of the press machine when the drop robot is outside of the drop synchronization threshold; and
combinations thereof.

10. The method of claim 9, wherein the preexisting pick segment parameters include recorded pick segment parameters from programing of the pick robot and the preexisting drop segment parameters include recorded drop segment parameters from programing of the drop robot.

11. The method of claim 9, wherein the preexisting pick segment parameters include recorded pick segment parameters from prior operation of the pick robot and the preexisting drop segment parameters include recorded drop segment parameters from prior operation of the drop robot.

12. The method of claim 7, further comprising a member of the group consisting of:
measuring the plurality of parameters associated with the plurality of pick segment movements, comparing the measured parameters with preexisting pick segment parameters to determine if the pick robot is within a pick synchronization threshold, and adjusting the pick robot to operate within the preexisting pick segment parameters when the pick robot is outside of the pick synchronization threshold;
measuring the plurality of parameters associated with the plurality of drop segment movements, comparing the measured parameters with preexisting drop segment parameters to determine if the drop robot is within a drop synchronization threshold, and adjusting the drop robot to operate within the preexisting pick segment parameters when the drop robot is outside of the drop synchronization threshold; and combinations thereof.

13. The method of claim 4, wherein the plurality of pick segment movements includes at least one change of direction.

14. The method of claim 4, wherein the plurality of drop segment movements includes at least one change of direction.

15. The method of claim 1, further comprising:

communicating to the press machine using the drop robot that the drop robot will not collide with the press machine during a closing of the operating area of the press machine; and closing the operating area of the press machine to press the blank into another part;

wherein:

moving the drop robot out of the operating area of the press machine comprises moving the drop robot out of the operating area of the press machine as the closing of the operating area of the press machine reaches a drop interlock angle prior to a bottom dead center position;

moving the drop robot carrying the blank into the operating area includes a plurality of drop segment movements; and a parameter associated with one of the drop segment movements is used by the press machine to synchronize movement of the press machine with the movement of the drop robot to prevent the drop robot or blank from colliding with the press machine during the closing of the operating of the press machine to press the blank into another part.

16. The method of claim 1, wherein the pick robot is further configured as a downstream drop robot for a downstream press machine to deliver the part as a downstream blank to the downstream press machine for a pressing of the downstream blank into a downstream part, wherein the downstream drop robot is in communication with a downstream pick robot and the movement of the downstream pick robot is synchronized with the movement of the downstream drop robot to prevent the downstream pick robot or the downstream part from colliding with the downstream drop robot or the downstream blank.

17. The method of claim 1, wherein moving the pick robot and the part out of the operating area while moving the drop robot carrying the blank into the operating area is dependent on the pick robot being in communication with the drop robot with respect to the critical point, where one of the pick robot and the drop robot waits until the other of the pick robot and the drop robot clears the critical point.

18. The method of claim 17, wherein:

moving the pick robot and the part out of the operating area includes a plurality of pick segment movements and a plurality of parameters is associated with the plurality of pick segment movements;

moving the drop robot carrying the blank into the operating area includes a plurality of drop segment movements and a plurality of parameters is associated with the plurality of drop segment movements; and a member selected from the group consisting of a parameter associated with the plurality pick segment movements, a parameter associated with the plurality drop segment movements, and combinations thereof is adjusted to minimize the wait of the one of the pick robot and the drop robot.

19. The method of claim 18, wherein the parameter associated with the plurality pick segment movements and the parameter associated with the plurality drop segment movements include a member selected from the group consisting of: a movement length, a movement time, an acceleration, a deceleration, and combinations thereof.

* * * * *